(12) United States Patent
Zhang et al.

(10) Patent No.: US 11,541,258 B2
(45) Date of Patent: Jan. 3, 2023

(54) FIRE EXTINGUISHING SYSTEM FOR BATTERY PACK

(71) Applicant: Yantai Chungway New Energy Technology Co., Ltd., Yantai (CN)

(72) Inventors: Lilei Zhang, Yantai (CN); Yifeng Zhao, Yantai (CN); Mingming Li, Yantai (CN); Yanwei Bi, Yantai (CN); Zhaojun Li, Yantai (CN); Xiaotong Shi, Yantai (CN)

(73) Assignee: YANTAI CHUNGWAY NEW ENERGY TECHNOLOGY CO., LTD., Yantai (CN)

( * ) Notice: Subject to any disclaimer, the term of this patent is extended or adjusted under 35 U.S.C. 154(b) by 119 days.

(21) Appl. No.: 17/133,116

(22) Filed: Dec. 23, 2020

(65) Prior Publication Data

US 2022/0193471 A1   Jun. 23, 2022

(51) Int. Cl.
*A62C 3/06* (2006.01)
*H01M 50/143* (2021.01)
*A62C 3/07* (2006.01)
*A62C 37/36* (2006.01)
*A62C 37/11* (2006.01)

(52) U.S. Cl.
CPC .............. *A62C 3/06* (2013.01); *A62C 3/07* (2013.01); *A62C 37/04* (2013.01); *A62C 37/11* (2013.01); *H01M 50/143* (2021.01); *H01M 2200/10* (2013.01); *H01M 2220/20* (2013.01)

(58) Field of Classification Search
CPC .. A62C 3/06; A62C 3/07; A62C 37/04; A62C 37/11; H01M 50/143; H01M 2200/10; H01M 2220/20
USPC .............................................. 169/60, 61, 70
See application file for complete search history.

(56) References Cited

U.S. PATENT DOCUMENTS 3,614,987 A * 10/1971 Bonne et al. ............ A62C 3/00
244/1 R

FOREIGN PATENT DOCUMENTS

| CN | 205494763 U | 8/2016 |
| CN | 111957128 A | 11/2020 |
| CN | 212118818 U | 12/2020 |

* cited by examiner

*Primary Examiner* — Christopher S Kim
(74) *Attorney, Agent, or Firm* — Chuangway IP (57) ABSTRACT

The present invention discloses a fire extinguishing system for a battery pack, including a detection control apparatus, a fire suppression apparatus, and a hydrant water extinguishing apparatus. The detection control apparatus is disposed inside or outside a battery pack. The fire suppression apparatus and the hydrant water extinguishing apparatus are disposed outside the battery pack. The detection control apparatus is connected to the fire suppression apparatus. The hydrant water extinguishing apparatus is connected to the fire suppression apparatus. Beneficial effects: It is ensured that initial fire can be suppressed and later reignition can be resolved, so that fire extinguishing is adequate. Fire is directly extinguished at a core position inside the battery pack. An exhaust filter device gains valuable time after initial fire extinguishing.

16 Claims, 7 Drawing Sheets

FIRE EXTINGUISHING SYSTEM FOR BATTERY PACK

TECHNICAL FIELD

The present invention relates to the field of fire extinguishing technology for battery packs, and specifically relates to a fire extinguishing system for a battery pack.

BACKGROUND

Three mandatory national standards (referred to as "three mandatory standards" for short hereinafter), namely, *GB 18384-2020Electric Vehicles Safety Requirements, GB 38032-2020Electric Bus Safety Requirements, and GB 30381-2020Safety Requirements for Power Batteries for Electric Vehicles*, formulated by the Ministry of Industry and Information Technology of the People's Republic of China on May 12, 2020 were approved and published by the State Administration for Market Regulation and the Standardization Administration of China and will come into effect from Jan. 1, 2021.

The three mandatory standards mandatorily stipulate that a battery system should provide an alarm signal within five minutes after thermal runaway occurs in a battery cell to ensure a safe egress time for passengers, imposing a higher requirement for the safety of new energy vehicles. It is specified in 12.10.3 in *GB 7258-2017Technical Specifications for Safety of Power-driven Vehicles Operating on Roads* that a battery electric bus or a plug-in hybrid electric bus having a length greater than or equal to 6 m shall be capable of monitoring the working status of the power battery and alarming when an abnormal situation is found, and there shall be no fire or explosion outside the battery box within 5 min after alarm. It is specified in 11.3 in *JT/T1240-2019Technical Specifications of Special Safety Facilities for Urban Public Bus and Trolleybus* that when thermal runaway occurs, a battery box fire extinguishing apparatus shall ensure that there is no fire or explosion outside the battery box within 5 min after a thermal accident signal is generated. *General Technical Specifications for Fire Prevention and Control Apparatuses for Power Lithium Ion Battery Boxes in Electric Buses* (CCCF/XFJJ-01) proposes that a fire prevention and control apparatus for a power lithium ion battery box in an electric bus includes a danger source detection product, data collection, transmission, linkage, and feedback apparatuses, an audible and visual alarm, a fire suppression agent, storage and release apparatuses, and the like. The suppression of thermal runaway in batteries satisfies requirements of the three mandatory standards and becomes a difficult issue that urgently needs to be resolved in the field of new energy vehicle safety.

In existing technical solutions of thermal runaway handling, for example, a single complex detection controller provides an alarm signal or a complex detection controller and a fire suppression apparatus are combined. In the foregoing technical solutions of handling, a single complex detection controller solution can only prompt a warning signal but cannot suppress thermal runaway. In the solution in which a complex detection controller and a fire suppression apparatus are combined, initial fire can be suppressed, but later reignition cannot be resolved. In addition, thermal runaway in ternary batteries or the like is intense to cause excessive pressure or even bursts in the box body of a power battery pack, leading to fires instantly.

At present, the most commercially applied solution is the solution in which a complex detection controller and a fire suppression apparatus are combined, thermal runaway with slow initial reaction can be suppressed, but thermal runaway with later reignition and intense combustion reactions cannot be suppressed.

Therefore, how to resolve later reignition of thermal runaway and intense thermal runaway is a problem that requires urgent research of persons skilled in the art, to ensure that initial fire can be suppressed and later reignition can be resolved, thereby reducing economic losses and avoiding injuries and deaths.

SUMMARY

An objective of the present invention is to provide a fire extinguishing system for a battery pack to overcome the deficiencies in the prior art. A fire suppression apparatus can ensure fire extinguishing and suppression of initial fire. A hydrant water extinguishing apparatus and/or a hydrant water extinguishing mechanism are added, so that if reignition occurs in a battery pack, hydrant water can be rapidly connected and directly transferred into the battery pack to implement fire extinguishing. Certainly, a particular time interval is required between the fire extinguishing of initial fire in the battery pack and the connection of hydrant water. To avoid thermal runaway and explosion inside the battery pack after reignition occurs in the battery pack, the present invention provides an exhaust filter device. The exhaust filter device may be used to smoothly exhaust a large amount of smoke and explosives that are generated when thermal runaway occurs inside the battery pack out of the battery pack, to implement pressure relief to protect the battery pack and at the same time gain time for the connection of hydrant water.

The objective of the present invention is achieved by using the following technical measure: A fire extinguishing system for a battery pack, including a detection control apparatus, a fire suppression apparatus, and a hydrant water extinguishing apparatus, where the detection control apparatus is connected to the fire suppression apparatus, and the hydrant water extinguishing apparatus is connected to the fire suppression apparatus.

Further, the detection control apparatus is a complex detection control apparatus, the detection control apparatus includes a detection device, the detection device includes one or more of a temperature sensor, a smoke sensor, a CO sensor, a photoelectric sensor, a hydrogen sensor, a VOC sensor, and a tactile switch, and the detection control apparatus transfers parameter signals detected by the detection device to the fire suppression apparatus after complex determination.

Further, the fire suppression apparatus is an exhaust filter device.

Further, condensed aerosol or dry powder or heptafluoropropane or hexafluoropropane or perfluoro(2-methyl-3-pentanone) is selected for a medium of the fire suppression apparatus, and single spraying or repeated spraying is selected for the spraying of the medium of the fire suppression apparatus.

Further, the fire suppression apparatus with repeated spraying is a pump-type fire extinguisher.

Further, the hydrant water extinguishing apparatus includes a housing, a latch mechanism, an on/off controlling assembly, and a connector mechanism, the latch mechanism, the on/off controlling assembly, and the connector mechanism are disposed inside the housing, the housing includes a shell and a gate, the gate is hinged to the shell, and the on/off controlling assembly controls the latch mechanism to open and lock the gate.

Further, the latch mechanism is an electronic lock.

Further, the on/off controlling assembly includes an electrical control module, a linkage assembly, and a latch switch, the electrical control module opens the latch switch in an electrical control manner, and the linkage assembly opens the latch switch in a mechanical transmission manner.

Further, the connector mechanism includes a hydrant port and an adapter, the hydrant port and the adapter are fixed inside the housing by a bolt, and the adapter is tightly connected to a side wall of the housing.

Further, the fire extinguishing system for a battery pack further includes an exhaust filter device, the exhaust filter device is connected to the battery pack, and the exhaust filter device exhausts smoke when combustion occurs inside the battery pack.

Further, the exhaust filter device includes an explosion-proof valve and a filter apparatus, one end of the explosion-proof valve is connected to the battery pack, the other end of the explosion-proof valve is connected to the filter apparatus; the filter apparatus includes an input port, an output port, a housing, and a filter mechanism, the input port and the output port are separately disposed at two ends of the housing, the filter mechanism is disposed inside the housing, and the filter mechanism is provided with a plurality of filter holes.

Further, a minimum diameter of the filter holes is less than 0.428 mm.

Further, the filter mechanism includes a first filter assembly and a second filter assembly, the first filter assembly and the second filter assembly are separately disposed on two sides of the filter mechanism in a transfer direction, the first filter assembly includes at least two first filter plates disposed at an interval, the second filter assembly includes at least two second filter plates disposed at an interval, and in the transfer direction of the filter mechanism, the at least two first filter plates are arranged in descending order of hole diameters of the filter holes, and the at least two second filter plates are arranged in descending order of hole diameters of the filter holes.

Further, a sum of a ventilation area of holes in a single first filter plate, a ventilation area of holes in an adjacent second filter plate, and an effective ventilation area of a single gap forms a single-layer ventilation area of the filter mechanism, and the single-layer ventilation area is greater than the cross-sectional area of the input port.

Further, an angle is formed between the first filter plate and a side wall of the housing in a length direction, the angle is greater than 0° and less than 180°, and the ventilation area of the first filter plate is greater than the cross-sectional area of the input port; an angle is formed between the second filter plate and the side wall of the housing in the length direction, the angle is greater than 0° and less than 180°, and a ventilation area of the second filter plate is greater than the cross-sectional area of the input port.

Further, a hydrant water extinguishing mechanism is disposed at the output port. The specific structure of the hydrant water extinguishing mechanism is the same as that of the hydrant water extinguishing apparatus.

Further, the explosion-proof valve includes a frame, a seal gasket, and a waterproof breathable film, wherein the seal gasket and the waterproof breathable film are separately disposed on the frame, the seal gasket is used for the tight connection between the explosion-proof valve and the battery pack, and the waterproof breathable film is used for pressure relief when thermal runaway occurs in the battery pack.

Compared with the prior art, the beneficial effects of the present invention are as follows: A fire suppression apparatus can ensure fire extinguishing and suppression of initial fire. A hydrant water extinguishing apparatus and/or a hydrant water extinguishing mechanism are added, so that if reignition occurs in a battery pack, hydrant water can be rapidly connected and directly transferred into the battery pack to implement fire extinguishing. Certainly, a particular time interval is required between the fire extinguishing of initial fire in the battery pack and the connection of hydrant water. To avoid thermal runaway and explosion inside the battery pack after reignition occurs in the battery pack, the present invention provides an exhaust filter device. The exhaust filter device may be used to smoothly exhaust a large amount of smoke and explosives that are generated when thermal runaway occurs inside the battery pack out of the battery pack, to implement pressure relief to protect the battery pack and at the same time gain time for the connection of hydrant water.

The present invention is described below in detail with reference to the accompanying drawings and specific implementations.

1. battery pack, 2. detection control apparatus, 3. fire suppression apparatus, 4. hydrant water extinguishing apparatus, 5. exhaust filter device, 6. connecting wiring harness, 7. three-way valve, 8. fire extinguishing agent tank, 9. fire-extinguishing piping, 10. nozzle, 11. hydrant water extinguishing mechanism, 12. filter apparatus, 13. explosion-proof valve, 14. exhaust tube, 15. output port, 16. input port, 17. filter mechanism, 18. housing, 19. filter hole, 20. first filter assembly, 21. second filter assembly, 22. first filter plate, 23. second filter plate, 24. frame, 25. seal gasket, 26. waterproof breathable film, 27. bolt hole, 28. gate, 29. first seal ring, 30. shell, 31. hydrant port, 32. second seal ring, 33. adapter, 34. first fixing nut, 35. third seal ring, 36. aviation connector, 37. electronic lock, 38. second fixing member, 39. electrical control module, 40. first fixing member, 41. latch switch, 42. latch push rod, 43. second fixing nut, 44. push rod, 45. third fixing nut, 46. buzzer, 47. spring, 48. acrylic panel, 49. switch push rod, 50. first compartment, 51. second compartment, 52. outer housing, 53. on/off controlling assembly, 54. connector mechanism, 55. linkage assembly, 56. outer frame, 57. liquid inlet channel, 58. liquid outlet channel, 59. pump set, 60. reagent box, 61. reagent input pipe, 62. reagent output pipe, 63. reagent outlet, 64. controller, 65. liquid level sensor, 66. external monitoring port, 67. warning port, 68. backup power, 69. fixing hole, 70. fix stopper, 71. handle, and 72. fixing base.

DESCRIPTION OF THE EMBODIMENTS

As shown in FIG. 1 to FIG. 10, a fire extinguishing system for a battery pack includes a detection control apparatus 2, a fire suppression apparatus 3, and a hydrant water extinguishing apparatus 4. The detection control apparatus 2 is disposed inside or outside a battery pack 1. The detection control apparatus 2 is connected to the fire suppression apparatus 3 by a connecting wiring harness 6. The fire suppression apparatus 3 is disposed inside or outside the battery pack 1. The hydrant water extinguishing apparatus 4 is disposed outside the battery pack 1. The fire suppression apparatus 3 includes a fire-extinguishing piping 9, a nozzle 10, and a fire extinguishing agent tank 8. The fire extinguishing agent tank 8 is connected to one end of the nozzle 10 by the fire-extinguishing piping 9. The other end of the nozzle 10 extends into the battery pack 1. The detection control apparatus 2 is connected to the fire suppression apparatus 3. The hydrant water extinguishing apparatus 4 is connected to the fire suppression apparatus 3. Specifically, the hydrant water extinguishing apparatus 4 is connected into the fire-extinguishing piping 9 by a three-way valve 7. The detection control apparatus 2 is a complex detection control apparatus 2. The detection control apparatus 2 includes a detection device. The detection device includes one or more of a temperature sensor, a smoke sensor, a CO sensor, a photoelectric sensor, a hydrogen sensor, a VOC sensor, and a tactile switch, and the detection control apparatus transfers parameter signals detected by the detection device to the fire suppression apparatus after complex determination, to activate the spray of the fire extinguishing agent. The detection control apparatus 2 performs early fire perception and intelligent determination inside the battery pack 1. The detection control apparatus 2 transfers the detected parameter signals to the fire suppression apparatus 3. After the fire suppression apparatus 3 receives a start signal from the detection control apparatus 2, a fire suppression medium inside the fire extinguishing agent tank 8 is transferred into the battery pack 1 through the fire-extinguishing piping 9 and the nozzle 10, to suppress initial fire, thereby providing the functions of early warning for thermal runaway and automatic fire extinguishing in the battery pack 1. Alternatively, a manual start switch may be used to implement manual control of the fire suppression apparatus 3. If later reignition or intense thermal runaway occurs, the hydrant water extinguishing apparatus 4 or a hydrant water extinguishing mechanism 11 is externally connected to a fire hydrant hose. After water is turned on, water can be smoothly inputted into the battery pack 1 to ensure the complete suppression of fire. An exhaust filter device 5 connected to the hydrant water extinguishing mechanism 11 can smoothly exhaust smoke inside the battery pack 1, to complete pressure relief, thereby delaying thermal runaway. Further, there are one or more detection control apparatuses 2, and one detection control apparatus 2 correspondingly detects one or more battery cells.

Figure 1:
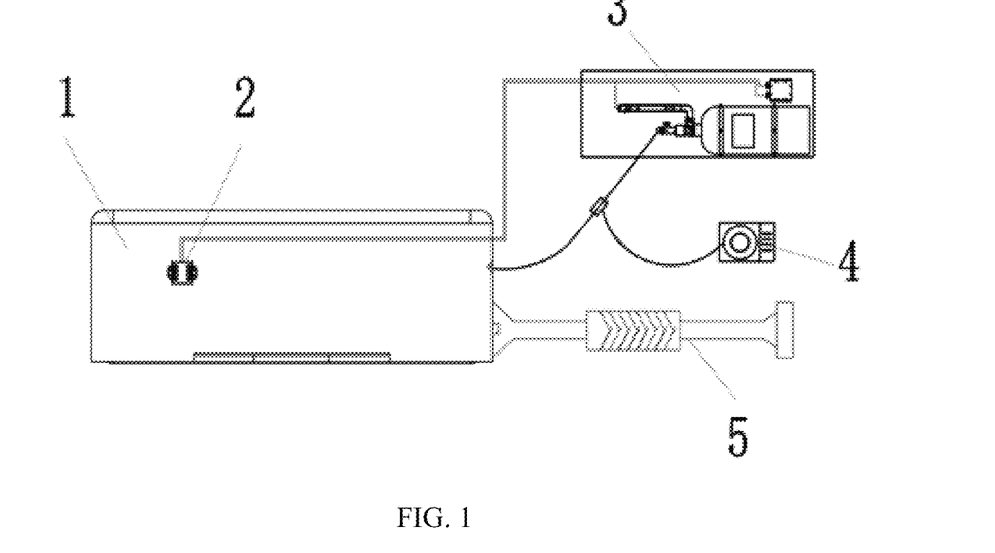
FIG. 1 is a schematic structural diagram of a fire extinguishing system for a battery pack.

The fire suppression apparatus 3 is an exhaust filter device 5. The exhaust filter device 5 in the present invention may be used as one form of the fire suppression apparatus 3 or may be a separate device in the fire extinguishing system for a battery pack, that is, it exists as another device in parallel to the fire suppression apparatus 3. Specifically, different fire extinguishing solutions are selected for the fire extinguishing of different batteries. With a lithium iron phosphate battery as an example, a combination of the detection control apparatus 2, the fire suppression apparatus 3 (in this case, any of the media listed in the claims, for example, perfluoro (2-methyl-3-pentanone), may be selected for the fire suppression apparatus 3), and the hydrant water extinguishing apparatus 4 may be selected to perform fire extinguishing. Certainly, based on the foregoing combination, the exhaust filter device 5 may further be added to perform fire extinguishing. With a ternary battery as an example, a combination of the detection control apparatus 2, the fire suppression apparatus 3 (in this case, the exhaust filter device 5 is selected for the fire suppression apparatus 3), and the hydrant water extinguishing apparatus 4 may be selected to perform fire extinguishing.

Figure 2:
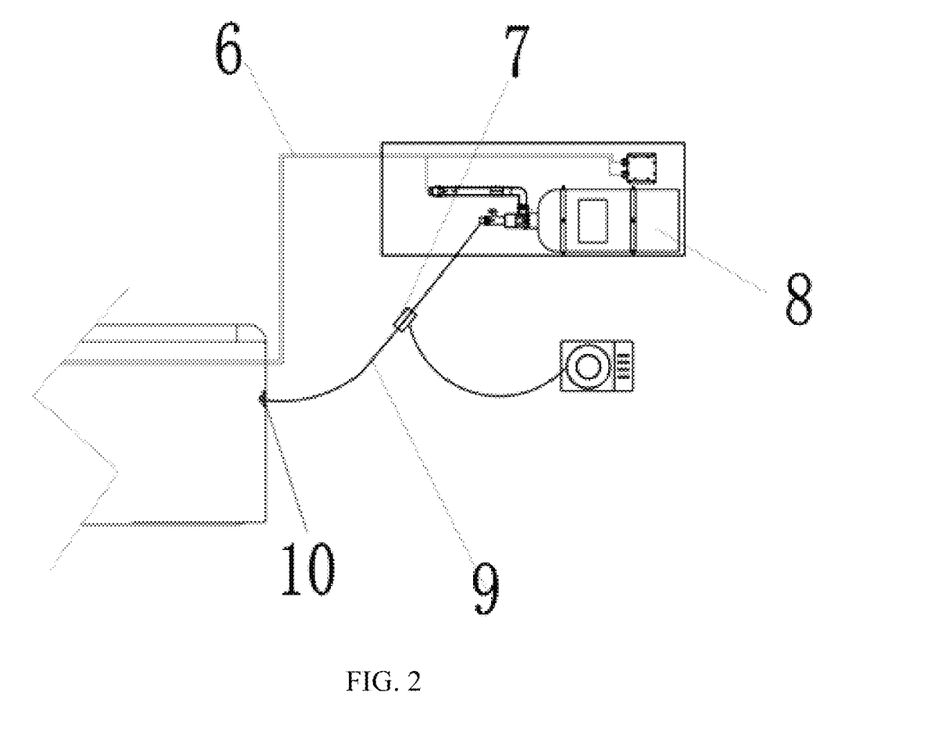
FIG. 2 is a partial schematic structural diagram of a fire suppression apparatus in a fire extinguishing system.

Condensed aerosol or dry powder or heptafluoropropane or hexafluoropropane or perfluoro(2-methyl-3-pentanone) is selected for a medium of the fire suppression apparatus 3, and single spraying or repeated spraying is selected for the spraying of the medium of the fire suppression apparatus 3. The fire suppression apparatus 3 with single spraying is relatively common in this industry, and there are, for example, an explosive (thermal aerosol) type, a pneumatic piston (non-pressure storage) type, a mechanical piston (non-pressure storage) type, a pressure storage (a dry powder fire extinguisher) type or the like. The fire suppression apparatus 3 with repeated spraying is, for example, a pump-type fire extinguisher or the like.

Figure 10:
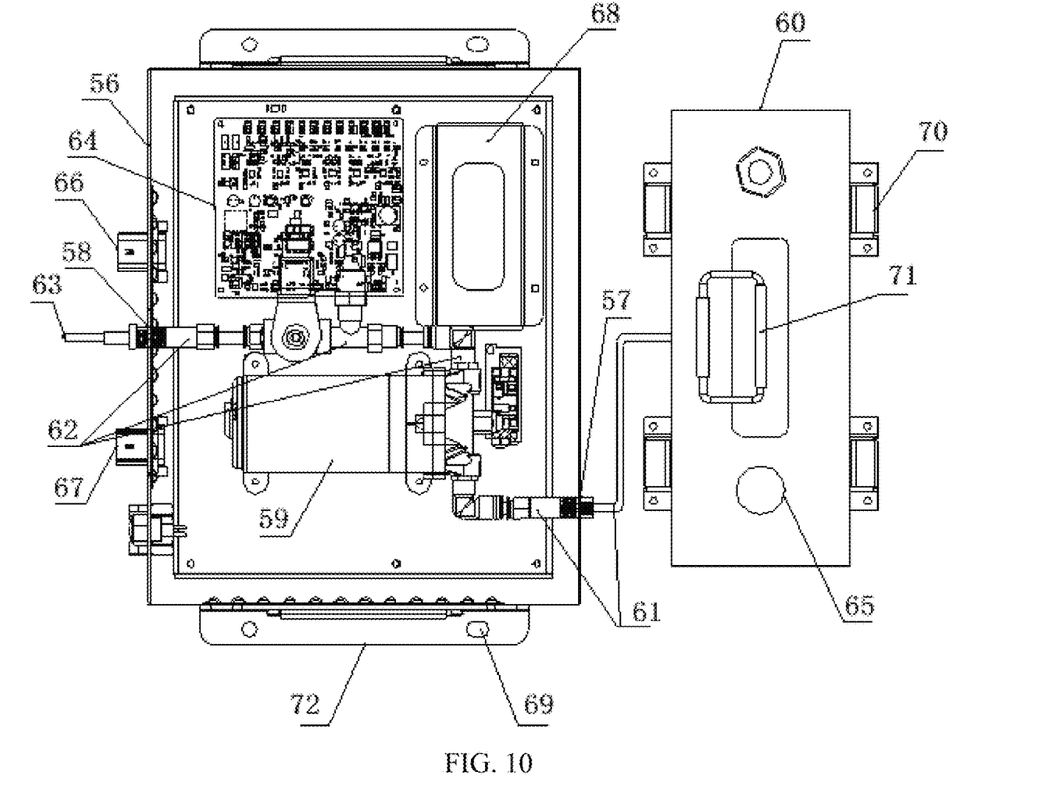
FIG. 10 is a schematic structural diagram of a pump-type fire extinguisher.

The pump-type fire extinguisher includes an outer frame 56. The outer frame 56 is provided with a liquid inlet channel 2 and a liquid outlet channel 3. A pump set 59 is disposed inside the outer frame 56. The pump set 59 is provided with a reagent box 60 filled with fire extinguishing agents. A reagent input pipe 61 and a reagent output pipe 62 are connected to the pump set 59. The reagent input pipe 61 is connected to the reagent box 60 through the liquid inlet channel 2. The reagent output pipe 62 is connected to the liquid outlet channel 3. A reagent outlet 63 is formed at a distal end of the reagent output pipe 62. A controller 64 is further disposed inside the outer frame 56. A liquid level sensor 65 is disposed inside the reagent box 60. The liquid level sensor 65 and the controller 64 are connected through an electrical circuit. The liquid level sensor 65 is configured to monitor the liquid level of the fire extinguishing agents inside the reagent box 60. The pump set 59 and the controller 64 are connected through an electrical circuit. The pump set 59 is configured to pump out the fire extinguishing agents inside the reagent box 60 through the reagent outlet 63.

Specifically, the pump set 59 and the controller 64 belong to the prior art. An appropriate model may be selected as required. For example, an intelligent water pump controller 64 GYK-1LP230X is used as the controller 64 to implement single-path pollutant discharge and pressure regulation and control.

An external monitoring port 66 is connected to the outer frame 56. The external monitoring port 66 and the controller 64 are connected through an electrical circuit. The external monitoring port 66 is used for the controller 64 to receive a battery pack thermal runaway danger warning signal. A warning port 67 is connected to the outer frame 56. The warning port 67 and the controller 64 are connected through an electrical circuit. The warning port 67 is configured to output the battery pack thermal runaway alarm information to the controller 64.

Specifically, the controller 64 receives a battery pack thermal runaway danger warning signal through the external monitoring port 66. A warning data level is recognized, analyzed, and determined based on an existing algorithm integrated in the controller 64 and is compared with a thermal runaway model and a preset danger level. As soon as a start temperature drop or a fire extinguishing level is reached, the algorithm sends a start instruction to enable the pump set 59 to be powered on to start working. The pump set 59 sucks in the fire extinguishing reagents from the outlet of the reagent box 60. A reagent flow is output by the pump set 59 from the reagent outlet 63 to implement the spraying of the reagent.

The controller 64 remotely transmits routine monitoring data, device anomaly data, and target danger data to the backend through the warning port 67 to form remote monitoring, thereby resolving the problem that failure information and danger information are unattended during actual application.

In an embodiment of the pump-type fire extinguisher, a backup power 68 is further included. The backup power 68 and the controller 64 are connected through an electrical circuit. The backup power 68 is configured to supply power to the pump-type fire extinguisher when the pump set 59 is started or external electricity is interrupted. The backup power 68 only temporarily supplies power when a motor of the pump set 59 is started or the external power is interrupted. When there is no danger, that is, in a normal state, an external power is used to supply power to the controller 64.

In an embodiment of the pump-type fire extinguisher, a relay is further included. The relay is connected between the pump set 59 and the controller 64. The connection and disconnection of the relay controls the working of the pump set 59.

In an embodiment of the pump-type fire extinguisher, fix stoppers 70 are disposed on the side of the reagent box 60. The reagent box 60 is limited between the fix stoppers 70. A handle 71 is connected at the top of the reagent box 60. The fix stoppers 70 are used to limit and fix the reagent box 60, to prevent pipes from damages due to shaking and displacement, and ensure the stability of the pump-type fire extinguisher. The design of the handle 71 makes it convenient to detach the reagent box 60 for reagent replenishing.

Specifically, a fixing base 72 is connected to the side of the outer frame 56. The fixing base 72 is provided with a fixing hole 69. The fixing base 72 fixes the outer frame 56 by a screw through the fixing hole 69, to ensure the stability of the members inside the outer frame 56, to prevent the shifting of the outer frame 56. Both the reagent box 60 and the outer frame 56 are separately fixed, to ensure a stable distance between the two, thereby avoiding damages to the pipes due to shaking.

The pump set 59 of the present invention is provided with the reagent box 60 filled with fire extinguishing agents. The reagent input pipe 61 and the reagent output pipe 62 are connected to the pump set 59. The reagent input pipe 61 is connected to the reagent box 60 through the liquid inlet channel 2. The reagent output pipe 62 is connected to the liquid outlet channel 3. The reagent outlet 63 is formed at a distal end of the reagent output pipe 62. The controller 64 is further disposed inside the outer frame 56. The liquid level sensor 65 is disposed inside the reagent box 60. The liquid level sensor 65 and the controller 64 are connected through an electrical circuit. The liquid level sensor 65 is configured to monitor the liquid level of fire extinguishing agents inside the reagent box 60. The pump set 59 and the controller 64 are connected through an electrical circuit. The pump set 59 is configured to pump out the fire extinguishing agents inside the reagent box 60 through the reagent outlet 63. The connection and disconnection of the relay controls the working of the pump set 59. The controller 64 receives the battery pack thermal runaway danger warning signal through the external monitoring port 66. The warning data level is recognized, analyzed, and determined based on an existing algorithm integrated in the controller 64 and is compared with a thermal runaway model and a preset danger level. As soon as a start temperature drop or a fire extinguishing level is reached, the algorithm sends a start instruction to enable the pump set 59 to be powered on to start working. The pump set 59 sucks in the fire extinguishing reagents from the outlet of the reagent box 60. A reagent flow is output by the pump set 59 from the reagent outlet 63 to implement the spraying of the reagent. The controller 64 remotely transmits routine monitoring data, device anomaly data, and target danger data to the backend through the warning port 67 to form remote monitoring, thereby resolving the problem that failure information and danger information are unattended during actual application. The backup power 68 only temporarily supplies power when a motor of the pump set 59 is started or the external power is interrupted. When there is no danger, that is, in a normal state, an external power is used to supply power to the controller 64. In the present invention, a highly reliable pump-type solution is used to resolve the problems of power supply and compressed spraying existed in the prior art, to thoroughly achieve the reliability of technology and repeated spraying. First, the pump set 59 is used to continuously suck liquid to supply pressure, thereby resolving the restriction that existing pre-stored pressure products can spray once only. Second, the industrial stipulation that pre-stored pressure products require annual inspection due to pressure storage is avoided. Third, a distributed layout manner of the pump set 59 and the reagent box 60 is more flexible, and the distributed layout manner is adaptable to more vehicle models, and the mounting position has high compatibility. In the present invention, the disadvantage of single spraying in conventional solutions is resolved, thereby effectively reducing the impacts of the temperature changes in battery packs on nearby battery packs, thus reducing the risk of heat conduction after thermal runaway occurs in the battery packs.

Figure 4:
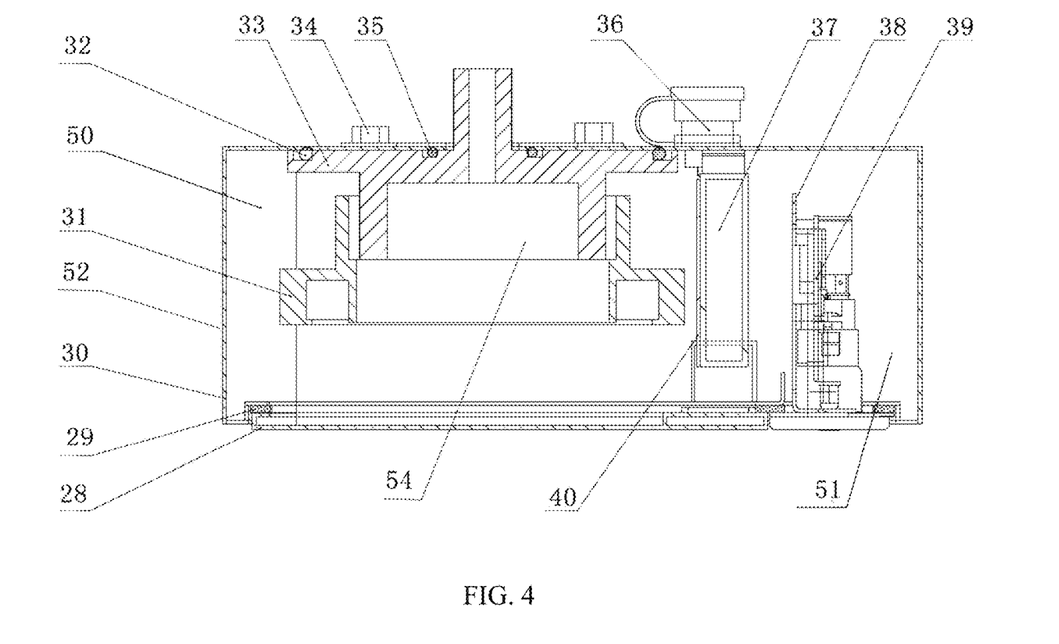
FIG. 4 is a schematic diagram of the internal structure of a hydrant water extinguishing apparatus.

The hydrant water extinguishing apparatus 4 is in communication with the fire-extinguishing piping 9 of the battery pack 1. The hydrant water extinguishing apparatus 4 includes an outer housing 52, a latch mechanism, an on/off controlling assembly 53, and a connector mechanism 54. The latch mechanism, the on/off controlling assembly 53, and the connector mechanism 54 are disposed inside the outer housing 52. The outer housing 52 includes a shell 30 and a gate 28. The gate 28 is hinged to the shell 30. The on/off controlling assembly 53 controls the latch mechanism to open and lock the gate 28. The latch mechanism is an electronic lock 37. The hydrant water extinguishing apparatus 4 is in communication with the fire-extinguishing piping 9 of the battery pack 1. Hydrant water is directly transferred to the position of the battery pack 1 to perform fire extinguishing, to implement direct fire extinguishing at a core position of the electric vehicle. When the hydrant water extinguishing apparatus 4 receives an ignition signal, the on/off controlling assembly 53 controls the electronic lock 37 to unlock, the electronic lock 37 is opened, and the gate 28 is thereby opened. After the gate 28 is opened, an external hydrant pipe is in communication with the connector mechanism 54. The hydrant water extinguishing apparatus 4 can directly transfer hydrant water to the core position (the battery pack 1) of the electric vehicle, to implement rapid fire extinguishing.

Figure 5:
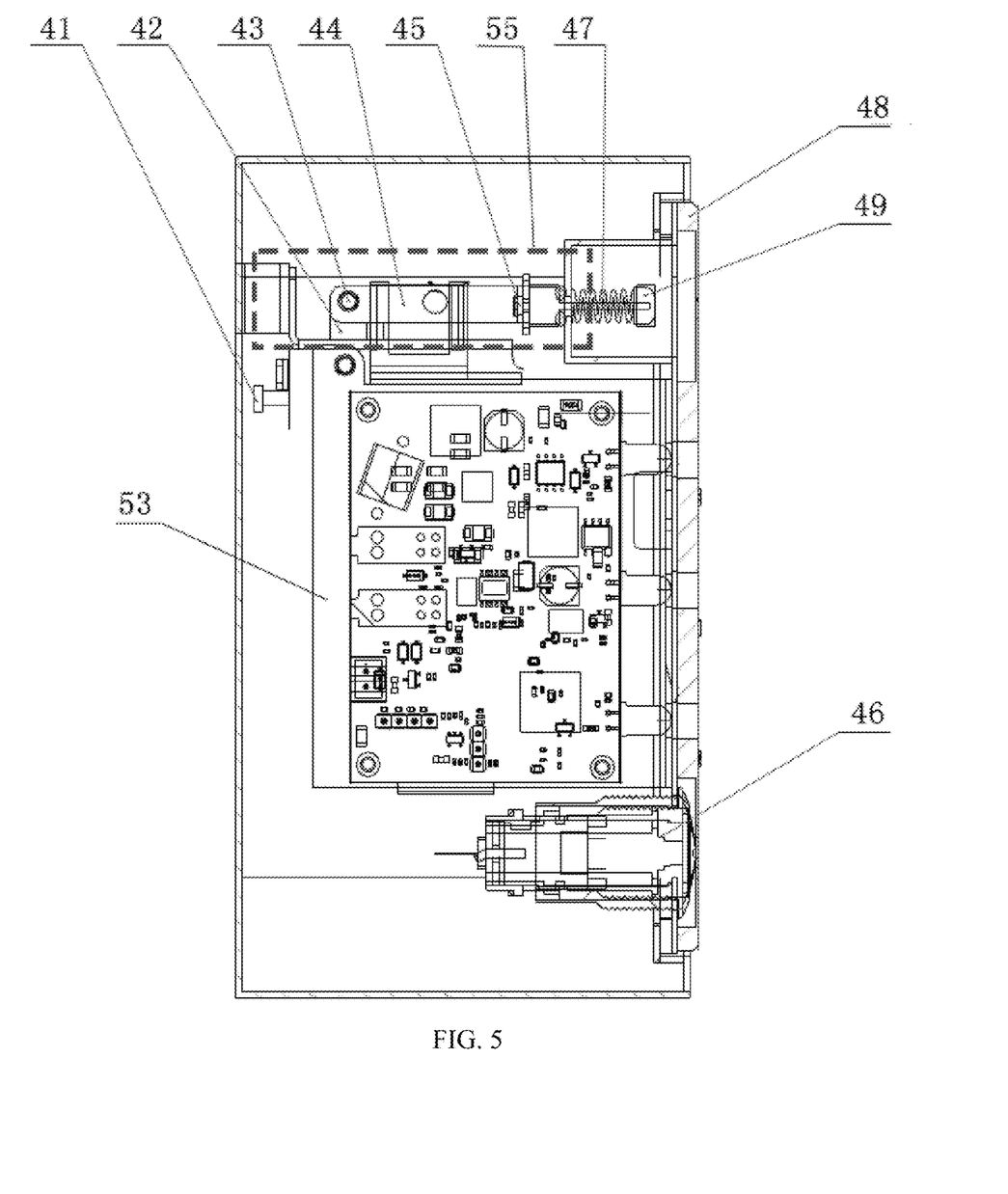
FIG. 5 is a schematic diagram of the internal structure of a second compartment in a hydrant water extinguishing apparatus.

The shell 30 includes two compartments, namely, a first compartment 50 and a second compartment 51. The connector mechanism 54 is disposed in the first compartment 50. The gate 28 is configured to cover the first compartment 50. The connector mechanism 54 extends out of the first compartment 50 at an end away from the gate 28 to be connected to the fire-extinguishing piping 9 of the battery pack 1. The electronic lock 37 and the on/off controlling assembly 53 are disposed in the second compartment 51. The connector mechanism 54 is related to hydrant water. The electronic lock 37 and the on/off controlling assembly 53 are more related to electricity. The connector mechanism 54 is separately disposed, so as to ensure the overall safety of the hydrant water extinguishing apparatus 4 as well as the safety of the electronic lock 37 and the on/off controlling assembly 53. The gate 28 is tightly connected to the first compartment 50 by a first seal ring 29.

A buzzer 46 is further disposed in the second compartment 51. An end of the buzzer 46 extends out of a side wall of the second compartment 51. The buzzer 46 is connected to the on/off controlling assembly 53. When the hydrant water extinguishing apparatus 4 receives an ignition signal, an electrical control module 39 activates the buzzer 46 and the light display. The buzzer 46 generates an alarm sound and emits red light, to prompt persons to perform fire extinguishing and further provide rescuers with sound and light guidance to rapidly find the position of a water port.

The latch mechanism is the electronic lock 37. The electronic lock 37 is fixedly connected to the second compartment 51 by a first fixing member 40. The electronic lock 37 is fixed to one end of the first fixing member 40, and the other end of the first fixing member 40 is fixed to the second compartment 51. Generally, the electronic lock 37 locks the gate 28.

The on/off controlling assembly 53 manually or electrically controls the electronic lock 37 to open the gate 28. Specifically, the on/off controlling assembly 53 includes the electrical control module 39, a linkage assembly 55, and a latch switch 41. The electrical control module 39 opens the latch switch 41 in an electrical control manner. The linkage assembly 55 opens the latch switch 41 in a mechanical transmission manner. In the mechanical transmission manner, the linkage assembly 55 includes a switch push rod 49, a push rod 44, and a latch push rod 42. The switch push rod 49, the push rod 44, and the latch push rod 42 are sequentially connected. Another end of the latch push rod 42 is connected to the latch switch 41. The switch push rod 49 is sleeved with a spring 47. The outer housing 52 is provided with a panel. The mounting position of the panel corresponds to the switch push rod 49. The panel is an acrylic panel 48. The acrylic panel 48 is embedded in a side wall of the second compartment 51. The electrical control module 39 is fixed on a second fixing member 38, and the second fixing member 38 is fixed to the second compartment 51. The switch push rod 49 and the push rod 44 are fixed together by a third fixing nut 45. The latch push rod 42 and the push rod 44 are fixed together by a second fixing nut 43. An aviation connector 36 is connected to a side wall of the second compartment 51. The aviation connector 36 is electrically connected to the electrical control module 39.

The connector mechanism 54 includes a hydrant port 31 and an adapter 33. The hydrant port 31 and the adapter 33 are fixed inside the outer housing 52 by a bolt. The adapter 33 is tightly connected to a side wall of the outer housing 52. The adapter 33 and the outer housing 52 are tightly connected by a second seal ring 32 and a third seal ring 35. The adapter 33 is fixed on the outer housing 52 by a first fixing nut 34. The adapter 33 is connected to the fire-extinguishing piping 9.

Figure 3:
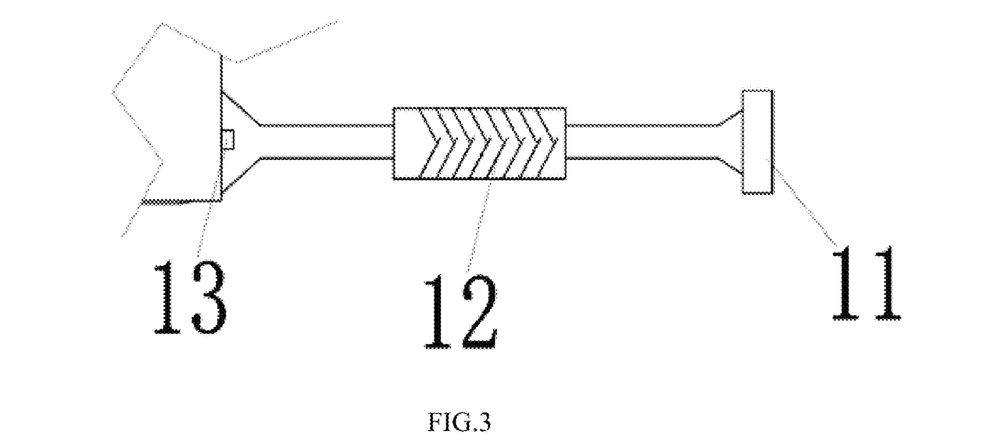
FIG. 3 is a partial schematic structural diagram of an exhaust filter device in a fire extinguishing system.

The exhaust filter device 5 includes an explosion-proof valve 13 and a filter apparatus 12. One end of the explosion-proof valve 13 is connected to the battery pack 1. The other end of the explosion-proof valve 13 is connected to the filter apparatus 12. The filter apparatus 12 includes an input port 16, an output port 15, a housing 18, and a filter mechanism 17. The input port 16 and the output port 15 are separately disposed at two ends of the housing 18. The filter mechanism 17 is disposed inside the housing 18. The filter mechanism 17 is provided with a plurality of filter holes 19. A minimum diameter of the filter holes 19 is less than 0.428 mm. The exhaust filter device 5 of the battery pack 1 further includes an exhaust tube 14 and the hydrant water extinguishing mechanism 11. The exhaust tube 14 is used for connecting the explosion-proof valve 13 with the filter apparatus 12. The hydrant water extinguishing mechanism 11 is connected to the output port 15 of the filter apparatus 12. A standard hydrant water extinguishing mechanism 11 is used for the hydrant water extinguishing mechanism 11. When thermal runaway occurs, the filter apparatus 12 gains sufficient time for passengers to wait for the arrival of a fire engine to, so that firefighters may directly and rapidly connect the hydrant water to the hydrant water extinguishing mechanism 11. The filter holes 19 in the filter mechanism 17 may adequately ensure the release of relatively high explosion pressure, especially the release of a large amount of smoke instantly generated by high-capacity batteries and battery modules, to avoid damages to the structure of the filter apparatus 12 or even the battery pack 1. The shape of the filter holes 19 may be a stripe, a circular hole, a square hole or the like. The plurality of filter holes in a single first filter plate 22 or a single second filter plate 23 may have consistent hole diameters or may have inconsistent hole diameters provided that the hole diameters descend from front to rear.

Figure 7A:
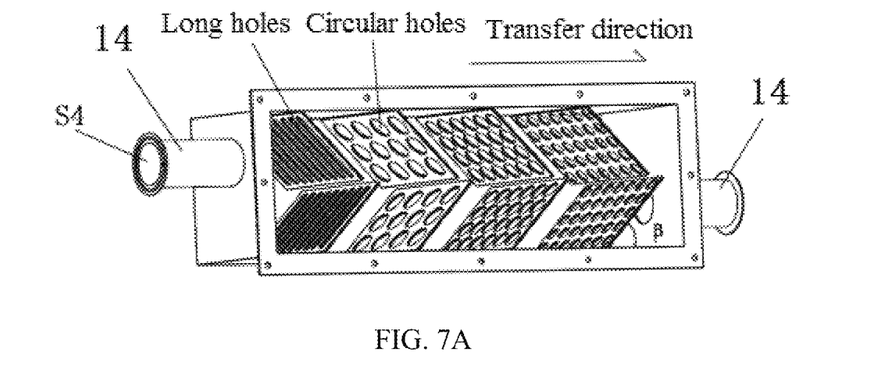
FIG. 7A is a schematic structural diagram of the first embodiment of the filter apparatus.
Figure 7B:
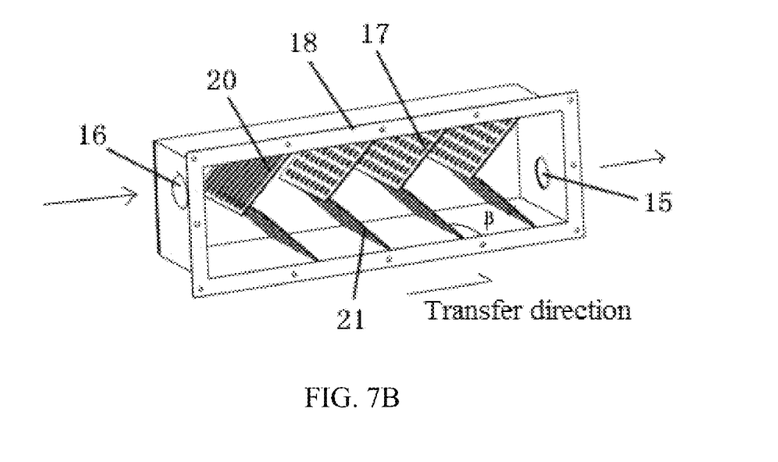
FIG. 7B is a schematic structural diagram of the second embodiment of the filter apparatus.
Figure 7C:
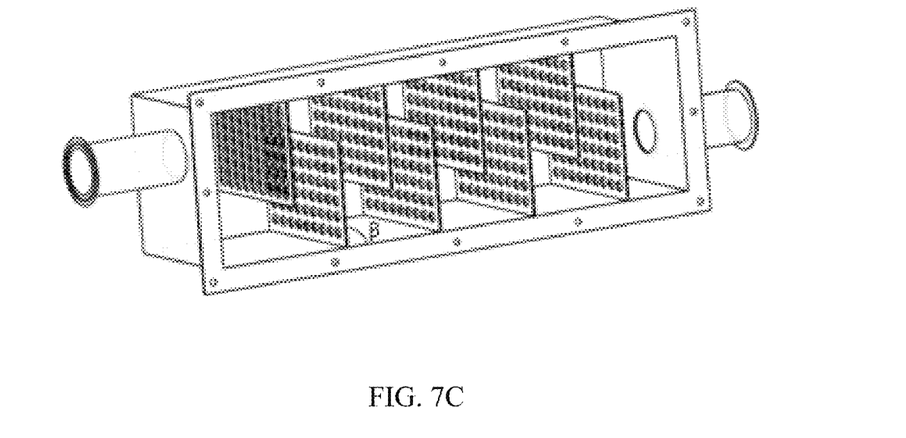
FIG. 7C is a schematic structural diagram of the third embodiment of the filter apparatus.

The filter mechanism 17 includes a first filter assembly 20 and a second filter assembly 21. The first filter assembly 20 and the second filter assembly 21 are separately disposed on two sides of the filter mechanism 17 in a transfer direction. The first filter assembly 20 includes at least two first filter plates 22 disposed at an interval. The second filter assembly 21 includes at least two second filter plates 23 disposed at an interval. In the transfer direction of the filter mechanism 17, the at least two first filter plates 22 are arranged in descending order of hole diameters of the filter holes 19. The at least two second filter plates 23 are arranged in descending order of hole diameters of the filter holes 19. Each first filter plate 22 is provided with a plurality of filter holes 19. Each second filter plate 23 is also provided with a plurality of filter holes 19. The plurality of filter holes 19 in the single first filter plate 22 or the single second filter plate 23 may have the same hole diameter, provided that in the transfer direction of the filter mechanism 17, the second filter plates 23 arranged in parallel have sequentially descending hole diameters from front to rear and the first filter plates 22 arranged in parallel also have sequentially descending hole diameters from front to rear, to implement the gradual filtering of the second filter assembly 21 or the first filter assembly 20. A relatively large hole diameter is used for the filter mechanism 17 near the end of the input port 16 of the filter apparatus 12, so that large solid particles such as copper foils and plastic pieces from the explosion and combustion of the explosion-proof valve 13 can be stopped. The hole diameter decreases in the transfer direction toward a distal end. A relatively small hole diameter may be used to filter out small solid particles such as sparks and dust. It is found through experiments of the technology in this application that, more than 95% of solid particles sprayed from thermal runaway in a multi-cell battery have particle sizes greater than 0.428 mm. Therefore, to implement optimal filtering of the filter apparatus 12 to enable exhaust gas to be free of solid particles, in the filter apparatus 12, a hole diameter at the distal end of the transfer direction is set to less than 0.428 mm. In this way, the filter apparatus 12 can filter out large solid particles, sparks, dust, and the like and can also release relatively high explosion pressure generated from thermal runaway in the battery pack 1, to ensure smooth exhaust of smoke.

The at least two first filter plates 22 are arranged in parallel, and the at least two second filter plates 23 are arranged in parallel. The specific quantity of the first filter plates 22 or the second filter plates 23 may be 3, 4, 5, etc. Regardless of the specific quantity of the first filter plates 22 or the second filter plates 23, the hole diameter of the first filter plate 22 or the second filter plate 23 at the distal end of the filter mechanism 17 in the transfer direction is less than 0.428 mm. The first filter plates 22 and the adjacent second filter plates 23 are arranged in a staggered manner. That is, one second filter plate 23 is inserted between two adjacent parallel first filter plates 22. However, the second filter plates 23 are disposed on a side opposite the side where the first filter plates 22 are connected to the housing 18, and the second filter plates 23 are not in contact with the first filter plates 22. Further, in the transfer direction perpendicular to the filter mechanism 17, a gap is provided between the first filter plates 22 and the closest second filter plates 23. The gap is used for the passage of smoke during thermal runaway in the battery pack 1.

Figure 8:
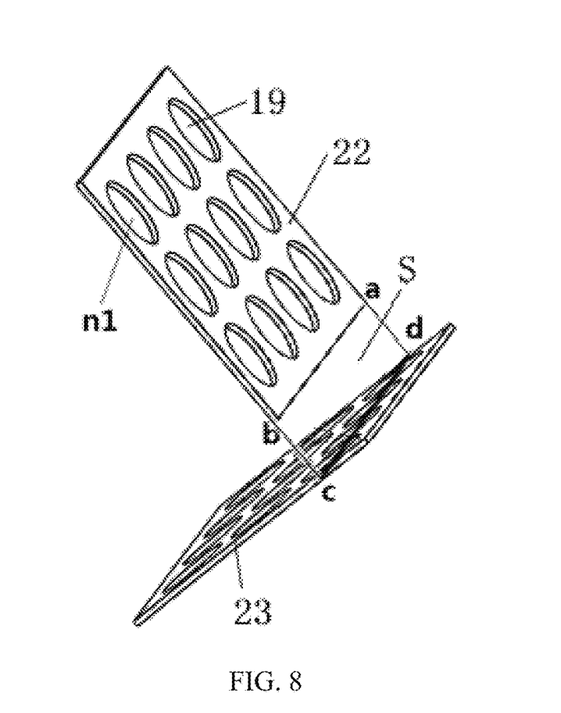
FIG. 8 is a schematic diagram of an effective ventilation area of a gap.

A sum of a ventilation area S1 of the holes in a single first filter plate 22, a ventilation area S2 of the holes in an adjacent second filter plate 23, and an effective ventilation area S of a single gap forms a single-layer ventilation area $S_{r1}$ of the filter mechanism 17, and the single-layer ventilation area $S_{r1}$ is greater than the cross-sectional area S3 of the input port 16. The input port 16 and the exhaust tube 14 may have the same diameter, and the input port 16 and the exhaust tube 14 may also have different diameters. In the case of different diameters, if the diameter of the exhaust tube 14 is greater than that of the input port 16, the single-layer ventilation area $S_{r1}$ is correspondingly greater than the cross-sectional area S4 of the exhaust tube 14; if the diameter of the exhaust tube 14 is less than that of the input port 16, the single-layer ventilation area $S_{r1}$ only needs to be greater than the cross-sectional area S3 of the input port 16. For calculating the single-layer ventilation area $S_{r1}$, if it is assumed that the area of a single hole is n1, the single first filter plate 22 or the adjacent second filter plate 23 is provided with 12 holes, then the ventilation area of the holes in the single first filter plate 22 is S1=12*n1, the ventilation area of the holes in the adjacent second filter plate 23 is S2=12*n1, the effective ventilation area of the gap is S, and $S_{r1}$=12*2*n1+S. When the first filter plate 22 and the second filter plate 23 have particular areas, the quantity of holes may be set according to different hole diameters. 12 holes are only an embodiment of the first filter plate 22 or the adjacent second filter plate 23.

The effective ventilation area S of the gap is greater than the cross-sectional area S3 of the input port 16. The effective ventilation area S refers to a minimum cross-sectional area for smoke to pass through the gap. The first filter plate 22 has a bottom side ab in the length direction. The bottom side ab extends to the surface of the second filter plate 23 along the length direction of the first filter plate 22 to form an intersection line cd. The effective ventilation area S is a planar area formed by the bottom side ab and the intersection line cd, as shown in FIG. 8.

An angle β is formed between the first filter plate 22 and a side wall of the housing 18 in a length direction, 0°<β<180°, and the ventilation area of a single first filter plate 22 is greater than the cross-sectional area of the input port 16. An angle β is formed between the second filter plate 23 and the side wall of the housing 18 in the length direction, 0°<β<180°, and the ventilation area of a single second filter plate 23 is greater than the cross-sectional area of the input port 16. The cross-sectional area of the input port 16 is an ejection area of smoke. In the design in which the ventilation area of the single second filter plate 23 or the ventilation area of the single first filter plate 22 is greater than the ejection area of smoke, the single first filter plate 22 or the second filter plate 23 may be used to implement first-stage filtering of ejected smoke. When there are a plurality of first filter plates 22 or second filter plates 23, multi-stage filtering of ejected smoke may be implemented, to ensure a filtering effect.

The first filter plate 22 adjacent to the input port 16 completely covers a linear smoke passage of the input port 16, to increase the effective filtering area for smoke of the first filter plate 22. If the first filter plate cannot cover the input port, the effective filtering area for smoke of the first filter plate 22 is reduced. When the linear smoke passage is located between the first filter plate 22 and the adjacent second filter plate 23, that is, a part of smoke ejected from the input port 16 is filtered by the first filter plate 22, and another part is filtered by the second filter plate 23, and still another part may directly enter the subsequent filter mechanism 17 through the gap. Apparently, in this manner, a part of the filtering areas of the first filter plate 22 and the second filter plate 23 is wasted.

In the transfer direction of the filter mechanism 17, the hole centers of the filter holes 19 in two longitudinally adjacent first filter plates 22 are arranged in an unaligned manner, and the hole centers of the filter holes 19 in two longitudinally adjacent second filter plates 23 are arranged in an unaligned manner. The hole centers are arranged in an unaligned manner to prevent smoke from directly passing through the two adjacent first filter plates 22 and also prevent smoke from directly passing through the two adjacent second filter plates 23, to ensure that smoke deflects between the first filter assembly 20 and the second filter assembly 21 to implement better filtering.

Figure 9:
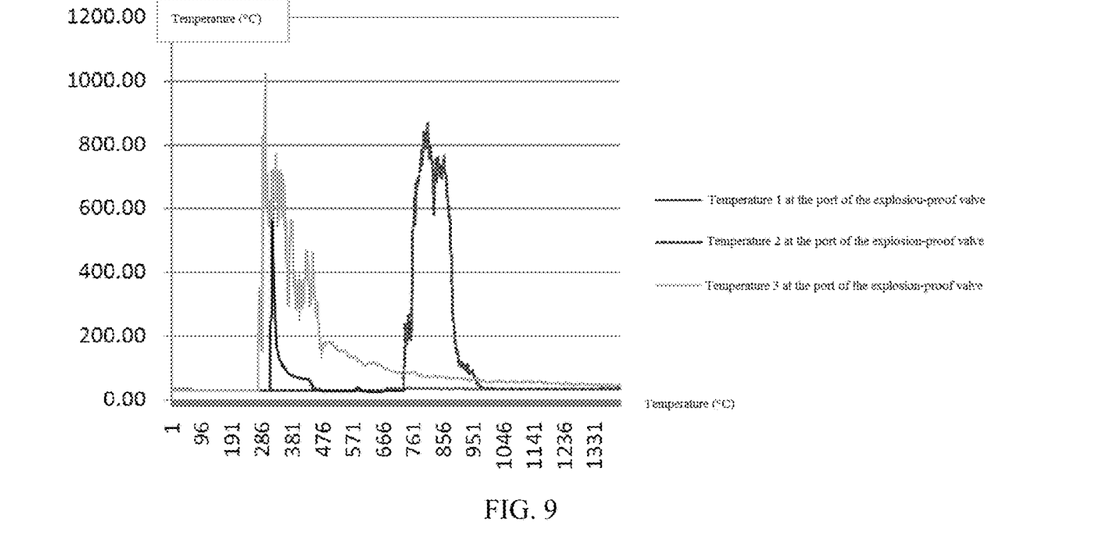
FIG. 9 is a detection diagram of a combustion temperature with a 153 Ah-ternary battery as an example.

A 153 Ah-ternary battery is used as an example. It is found through experiments that when thermal runaway occurs in the 153 Ah-ternary battery, combustion is intense, and the temperature at the port of the explosion-proof valve 13 is up to 1022.20° C. Therefore, for a high-capacity battery, the material of the exhaust tube 14 for discharging smoke needs to be selected, to better satisfy the requirement for smoke discharging. In addition, a large amount of smoke generated instantly exerts an excessively high pressure. Therefore, it's preferable for the exhaust tube 14 to be capable of withstanding high pressure. Based on the foregoing characteristics of thermal runaway in high-capacity batteries, the exhaust tube 14 is preferentially made of stainless steel 304 that withstands high temperature and high pressure and has a light weight. Because stainless steel 304 has excellent characteristics, in the case of meeting the use requirements, the thickness of a tube wall may be smaller, thereby reducing the overall weight of the exhaust filter device 5 and at the same time reducing costs.

The cross-sectional area S4 of the exhaust tube 14 is less than or equal to a cross-sectional area S5 of the filter apparatus 12.

Figure 6:
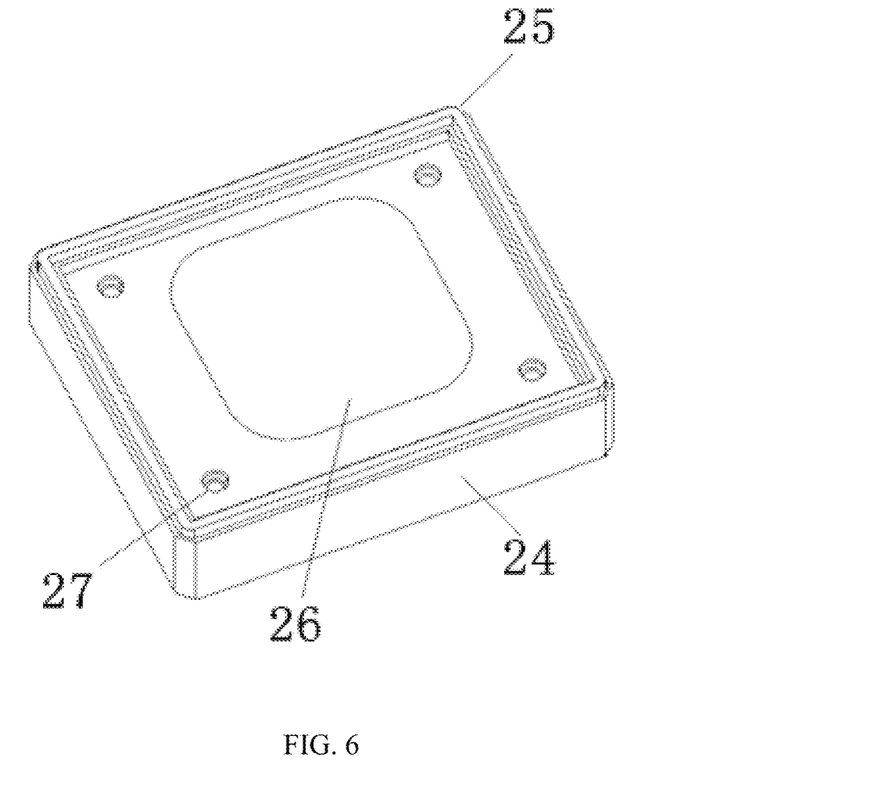
FIG. 6 is a schematic structural diagram of an explosion-proof valve.

As shown in FIG. 3, the explosion-proof valve 13 includes a frame 24, a seal gasket 25, and a waterproof breathable film 26. The seal gasket 25 is disposed at a peripheral edge of the frame 24. A penetrating channel is provided in the middle of the frame 24. The waterproof breathable film 26 used for covering the channel is mounted on the frame 24. The seal gasket 25 is used for a sealed connection between the explosion-proof valve 13 and the battery pack 1. The waterproof breathable film 26 is used for pressure relief during thermal runaway in the battery pack 1. The peripheral edge of the frame 24 is provided with at least two bolt holes 27. The explosion-proof valve 13 is connected to the battery pack 1 by the at least two bolt holes 27. The housing 18 of the battery pack 1 is provided with a through hole. There is at least one through hole. The area of the through hole matches that of the waterproof breathable film 26. The waterproof breathable film 26 can completely cover the through hole. In this application, for the characteristic that a large amount of smoke is instantly generated in a high-capacity battery and a battery module, new improvements are made to the existing explosion-proof valve 13. The waterproof breathable film 26 is waterproof and breathable, to adequately maintain pressure balance between the inside and outside of the battery pack 1. During thermal runaway, the waterproof breathable film 26 of the explosion-proof valve 13 is exploded. The channel penetrating in the middle of the frame 24 is opened. Particles from explosion pass through the channel to be smoothly exhausted from the battery pack 1 without hindrance, and the pressure is sufficiently relieved, to ensure the smooth discharge of smoke. When there are a plurality of through holes, one explosion-proof valve 13 may be mounted in each through hole, and these explosion-proof valves are jointly connected into the filter apparatus 12 through a corresponding quantity of exhaust tubes. Certainly, one through hole may correspond to one filter apparatus 12.

Embodiment 1 of the filter apparatus is shown in FIG. 1A. An arrangement angle between the first filter plate 22 and the second filter plate 23 is 135°. A pipe on the left side of the filter apparatus 12 is the exhaust tube 14 of a smoke inlet. The inlet is located at a ⅓ position near the top of the filter apparatus 12. The first filter assembly 20 in the upper layer can cover the linear passage of the smoke inlet. A pipe on the right side is the exhaust tube 14 of a smoke outlet. The outlet is located at a ⅓ position near the bottom of the filter apparatus 12. Similarly, the second filter assembly 21 in the lower layer can cover the linear passage of the smoke outlet. The filter hole 19 in the first filter plate 22 at the input port 16 is a long hole, and other filter holes 19 are circular holes, so that large copper foils, plastic blocks from the explosion and combustion of the explosion-proof valve 13, the seal gasket 25, and the like can be effectively isolated. The large solid blocks would then slide down to a vacant position at the bottom of the filter apparatus 12. Subsequently, the first filter plate 22 and the second filter plate 23 are provided with filter holes 19 having gradually descending hole diameters, to implement gradual filtering. The filter holes 19 in longitudinally arranged filter plates are arranged in a staggered manner, so that the filtering effect can be effectively enhanced. An angle β between the first filter plate 22 and a side wall of the top of the housing 18 in the length direction is 45 degrees, and an angle β between the second filter plate 23 and a side wall of the bottom of the housing 18 in the length direction is 45 degrees. The first filter plate 22 and the second filter plate 23 are staggered and perpendicular to each other but are not in contact. A gap is kept between the first filter plate 22 and the second filter plate 23. The effective ventilation area of the gap is not less than the cross-sectional area S4 of the exhaust tube 14, to ensure that the exhaust and pressure relief channel is unimpeded, and the exhaust and pressure relief channel can smoothly exhaust smoke even if the first filter plate 22 and the second filter plate 23 are completely blocked by solid particles.

Embodiment 2 of the filter apparatus is shown in FIG. 1B. An arrangement angle between the first filter plate 22 and the second filter plate 23 is 45°, solid particles are filtered, and smoke is smoothly exhausted. For the filter holes 19, a combination of long holes and circular holes is adopted.

Embodiment 3 of the filter apparatus is shown in FIG. 1C. The first filter plate 22 and the second filter plate 23 are vertically arranged in a staggered manner. An angle between the first filter plate 22 or the second filter plate 23 and a side wall of the housing 18 in the length direction is 90 degrees, and solid particles can also be effectively isolated and filtered, and smoke can be smoothly exhausted. The filter holes 19 are all circular holes.

A pressure relief and exhaust process: The waterproof breathable film 26 of the explosion-proof valve 13 explodes under the effect of a large amount of smoke generated from thermal runaway in the battery pack 1. The smoke flows through the channel in the explosion-proof valve 13 and enters the filter apparatus 12 along the exhaust tube 14. The pressure of the smoke is reduced inside the housing 18 of the filter apparatus 12. With the multi-stage filtering of the first filter assembly 20 and the second filter assembly 21, the smoke is deflected and filtered. After thorough filtering with blockage, the smoke is eventually exhausted by the hydrant water extinguishing mechanism 11. When a fire engine is connected to the hydrant water extinguishing mechanism 11, water enters the filter apparatus 12 from the hydrant water extinguishing mechanism 11, flows through the filter holes 19 and the gap in the filter apparatus 12 to enter the channel in the explosion-proof valve 13, and eventually enters the battery pack 1 to reduce the temperature and extinguish the fire.

For a person skilled in the art, apparently, the present invention is not limited to the details in the foregoing exemplary embodiments, and the present invention can be implemented in other specific forms without departing from the spirit or basic features of the present invention. Therefore, from all perspectives, the embodiments should be considered as exemplary and non-limitative. The scope of the present invention is defined by the appended claims instead of the foregoing description. Therefore, all changes that fall within the meanings and scope of equivalent elements of the claims are intended to be covered by the present invention. Any reference numeral in the claims should not be construed as limiting the related claims.

In addition, it should be understood that although the specification is described according to the implementations, each implementation does not necessarily include only one independent technical solution. The description manner of the specification is only used for clarity, and a person skilled in the art should consider the specification as a whole. The technical solutions in the embodiments may be appropriately combined to form other implementations comprehensible to a person skilled in the art.

What is claimed is:

1. A fire extinguishing system for a battery pack, comprising a detection control apparatus, a fire suppression apparatus, and a hydrant water extinguishing apparatus, wherein the detection control apparatus is connected to the fire suppression apparatus, and the hydrant water extinguishing apparatus is connected to the fire suppression apparatus and wherein the hydrant water extinguishing apparatus comprises a housing, a latch mechanism, an on/off controlling assembly, and a connector mechanism, the latch mechanism, the on/off controlling assembly, and the connector mechanism are disposed inside the housing, the housing comprises a shell and a gate, the gate is hinged to the shell, and the on/off controlling assembly controls the latch mechanism to open and lock the gate.

2. The fire extinguishing system for a battery pack according to claim 1, wherein the detection control apparatus comprises a detection device, the detection device comprises one or more of a temperature sensor, a smoke sensor, a CO sensor, a photoelectric sensor, a hydrogen sensor, a VOC sensor, and a tactile switch, and the detection control apparatus transfers parameter signals detected by the detection device to the fire suppression apparatus.

3. The fire extinguishing system for a battery pack according to claim 1, further comprising an exhaust filter device.

4. The fire extinguishing system for a battery pack according to claim 1, wherein the fire suppression apparatus comprises a medium comprising condensed aerosol or dry powder or heptafluoropropane or hexafluoropropane or perfluoro(2-methyl-3-pentanone), and the fire suppression apparatus is configured to spray the medium by single spraying or repeated spraying.

5. The fire extinguishing system for a battery pack according to claim 4, wherein the fire suppression apparatus with repeated spraying is a fire extinguisher comprising a pump.

6. The fire extinguishing system for a battery pack according to claim 1, wherein the latch mechanism is an electronic lock.

7. The fire extinguishing system for a battery pack according to claim 1, wherein the on/off controlling assembly comprises an electrical control module, a linkage assembly, and a latch switch, the electrical control module opens the latch switch in an electrical control manner, and the linkage assembly opens the latch switch in a mechanical transmission manner.

8. The fire extinguishing system for a battery pack according to claim 1, wherein the connector mechanism comprises a hydrant port and an adapter, the hydrant port and the adapter are fixed inside the housing by a bolt, and the adapter is tightly connected to a side wall of the housing.

9. A fire extinguishing system for a battery pack comprising a detection control apparatus, a fire suppression apparatus, and a hydrant water extinguishing apparatus, wherein the detection control apparatus is connected to the fire suppression apparatus, and the hydrant water extinguishing apparatus is connected to the fire suppression apparatus, wherein the fire extinguishing system for a battery pack further comprises an exhaust filter device, the exhaust filter device is connected to a battery pack, and the exhaust filter device exhausts smoke when combustion occurs inside the battery pack.

10. The fire extinguishing system for a battery pack according to claim 9, wherein the exhaust filter device comprises an explosion-proof valve and a filter apparatus, one end of the explosion-proof valve is connected to the battery pack, the other end of the explosion-proof valve is connected to the filter apparatus, the filter apparatus comprises an input port, an output port, a housing, and a filter mechanism, the input port and the output port are separately disposed at two ends of the housing, the filter mechanism is disposed inside the housing, and the filter mechanism is provided with a plurality of filter holes.

11. The fire extinguishing system for a battery pack according to claim 10, wherein a minimum diameter of the filter holes is less than 0.428 mm.

12. The fire extinguishing system for a battery pack according to claim 11, wherein the filter mechanism comprises a first filter assembly and a second filter assembly, the first filter assembly and the second filter assembly are separately disposed on two sides of the filter mechanism in a transfer direction, the first filter assembly comprises at least two first filter plates disposed at an interval, the second filter assembly comprises at least two second filter plates disposed at an interval, and in the transfer direction of the filter mechanism, the at least two first filter plates are arranged in descending order of hole diameters of the filter holes, and the at least two second filter plates are arranged in descending order of hole diameters of the filter holes.

13. The fire extinguishing system for a battery pack according to claim 12, wherein a sum of a ventilation area of holes in a single first filter plate, a ventilation area of holes in an adjacent second filter plate, and an effective ventilation area of a single gap forms a single-layer ventilation area of the filter mechanism, and the single-layer ventilation area is greater than the cross-sectional area of the input port.

14. The fire extinguishing system for a battery pack according to claim 13, wherein an angle is formed between the first filter plate and a side wall of the housing in a length direction, the angle is greater than 0° and less than 180°, and the ventilation area of the first filter plate is greater than the cross-sectional area of the input port; an angle is formed between the second filter plate and the side wall of the housing in the length direction, the angle is greater than 0° and less than 180°, and the ventilation area of the second filter plate is greater than the cross-sectional area of the input port.

15. The fire extinguishing system for a battery pack according to claim 10, wherein a hydrant water extinguishing mechanism is disposed at the output port.

16. The fire extinguishing system for a battery pack according to claim 10, wherein the explosion-proof valve comprises a frame, a seal gasket, and a waterproof breathable film, the seal gasket and the waterproof breathable film are separately disposed on the frame, the seal gasket is used for the tight connection between the explosion-proof valve and the battery pack, and the waterproof breathable film is used for pressure relief when thermal runaway occurs in the battery pack.

\* \* \* \* \*